US012512006B2

(12) United States Patent
May (10) Patent No.: US 12,512,006 B2
(45) Date of Patent: Dec. 30, 2025

(54) MOVING TARGET OF INTEREST PREDICTIVE LOCATING, REPORTING, AND ALERTING (71) Applicant: Joshua May, Twin Peaks, CA (US)

(72) Inventor: Joshua May, Twin Peaks, CA (US)

( * ) Notice: Subject to any disclaimer, the term of this patent is extended or adjusted under 35 U.S.C. 154(b) by 588 days.

(21) Appl. No.: 17/965,256

(22) Filed: Oct. 13, 2022

(65) Prior Publication Data

US 2023/0046309 A1    Feb. 16, 2023

Related U.S. Application Data (63) Continuation-in-part of application No. 16/189,938, filed on Nov. 13, 2018, now Pat. No. 11,488,393, and a continuation-in-part of application No. 16/748,165, filed on Jan. 21, 2020, now abandoned.

(60) Provisional application No. 62/585,776, filed on Nov. 14, 2017.

(51) Int. Cl.
*G08G 5/80* (2025.01)
*G08G 5/22* (2025.01)
*G08G 5/26* (2025.01)
*G08G 5/55* (2025.01)
*G08G 5/59* (2025.01)

(52) U.S. Cl.
CPC ............... *G08G 5/80* (2025.01); *G08G 5/22* (2025.01); *G08G 5/26* (2025.01); *G08G 5/55* (2025.01); *G08G 5/59* (2025.01)

(58) Field of Classification Search
None
See application file for complete search history.

(56) References Cited

U.S. PATENT DOCUMENTS

| 5,935,190 A | 8/1999 | Davis et al. |
| 8,630,795 B2 | 1/2014 | Breed et al. |
| 9,053,636 B2 | 6/2015 | Gordon |
| 9,286,800 B2 | 3/2016 | Gordon |
| 9,573,592 B2 * | 2/2017 | Prokhorov ........ B60W 60/0015 |
| 9,799,218 B1 | 10/2017 | Gordon |
| 9,972,201 B2 | 5/2018 | Wang |
| 10,493,996 B2 * | 12/2019 | Phillips ............. B60W 50/0098 |
| 10,496,091 B1 * | 12/2019 | Ross ........................ G06N 5/04 |
| 10,650,621 B1 * | 5/2020 | King .................... G07C 5/0816 |
| 11,250,695 B2 * | 2/2022 | Mielenz ........... G08G 1/096783 |

(Continued)

*Primary Examiner* — Nancy Bitar
(74) *Attorney, Agent, or Firm* — Kirk A. Buhler; Buhler & Associates Patenting (57) ABSTRACT Systems and corresponding methods are provided for moving object predictive locating, reporting, and alerting. This method includes receiving moving object data corresponding to a moving object; receiving sensor data from a sensor and merging the received moving object data and the received sensor data into a set of merged data. The example method further includes based on the set of merged data, automatically determining one or more of a predicted location or range of locations for the moving object, a potential path of travel for the moving object, an alert concerning the moving object, and providing the alert. The automatically determining may be further based on one or more historical traits concerning the object, and the geographic medium the object is moving through. The geographic medium may include one or more of terrain, air, water, and space. The object may be a soldier, vehicle, drone, or ballistic.

17 Claims, 7 Drawing Sheets

(56) References Cited

U.S. PATENT DOCUMENTS

| | | | |
|---|---|---|---|
| 12,210,230 B1* | 1/2025 | Lewis | G02B 27/0093 |
| 12,385,197 B1* | 8/2025 | Bunch | B60K 35/20 |
| 2002/0019703 A1 | 2/2002 | Levine | |
| 2009/0160678 A1* | 6/2009 | Turnbull | B60Q 1/547 |
| | | | 340/944 |
| 2013/0192182 A1 | 8/2013 | Bro et al. | |
| 2013/0231858 A1 | 9/2013 | Bourne | |
| 2014/0012494 A1* | 1/2014 | Cudak | G01C 21/3415 |
| | | | 701/465 |
| 2014/0302877 A1 | 10/2014 | Johnson | |
| 2015/0228188 A1 | 8/2015 | Macfarlane | |
| 2016/0017397 A1 | 1/2016 | Roy et al. | |
| 2016/0027301 A1 | 1/2016 | Publicover | |
| 2016/0140614 A1* | 5/2016 | Brubaker | G06Q 30/0266 |
| | | | 705/14.62 |
| 2016/0163217 A1 | 6/2016 | Harkness | |
| 2016/0176397 A1* | 6/2016 | Prokhorov | G05D 1/0214 |
| | | | 701/25 |
| 2016/0301744 A1 | 10/2016 | Kimchi et al. | |
| 2017/0076595 A1 | 3/2017 | Macfarlane | |
| 2017/0106876 A1* | 4/2017 | Gordon | B60W 60/0059 |
| 2017/0197617 A1* | 7/2017 | Penilla | G08G 1/0129 |
| 2017/0369055 A1* | 12/2017 | Saigusa | G08G 1/096775 |
| 2018/0204465 A1 | 7/2018 | Tong et al. | |
| 2019/0045348 A1* | 2/2019 | Li | H04B 7/18506 |
| 2019/0311614 A1 | 10/2019 | Yang et al. | |

* cited by examiner

MOVING TARGET OF INTEREST PREDICTIVE LOCATING, REPORTING, AND ALERTING

CROSS REFERENCE TO RELATED APPLICATIONS

This application claims the benefit of pending application Ser. No. 16/748,165 filed Jan. 21, 2020, and application Ser. No. 16/189,938 filed Nov. 13, 2018, that issued as U.S. Pat. No. 11,488,393 on Nov. 1, 2022, and Provisional Application Ser. No. 62/585,776 filed Nov. 14, 2017, the entire contents of which is hereby expressly incorporated by reference herein.

STATEMENT REGARDING FEDERALLY SPONSORED RESEARCH OR DEVELOPMENT

Not Applicable

The Names of the Parties to a Joint Research Agreement

Not Applicable

INCORPORATION-BY-REFERENCE OF MATERIAL SUBMITTED ON A COMPACT DISC

Not Applicable

BACKGROUND OF THE INVENTION

Field of the Invention

The present technology pertains in general to objects of many types, more specifically, to moving object determination, reporting, predicting, and/or alerting.

Description of Related Art including information disclosed under 37 CFR 1.97 and 1.98.

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

A number of patents and or publications have been made to address these issues. Exemplary examples of patents and or publication that try to address this/these problem(s) are identified and discussed below.

U.S. Pat. No. 5,935,190 issued on Aug. 10, 1999, to Clint A. Davis is titled Traffic Monitoring. This patent discloses a traffic monitoring system has a common housing for a Doppler radar transceiver, a video camera, and a digital computer for processing the Doppler signal. The system also includes a video cassette recorder, a high-speed photographic camera, and a laptop computer for downloading control settings and a program from a diskette or memory card to the digital computer. The digital computer performs an initial self-test by injecting a calibration signal in lieu of a Doppler signal into an electronic interface between the radar transceiver and the digital computer. While this patent discloses monitoring traffic it only identifies someone who is speeding, it does not identify an erratic driver and further does not have a system to warn other drivers.

U.S. Patent publication number 2013/0197736 was published on Aug. 1, 2013, for Jiajun et al., disclose a vehicle control based on perception uncertainty. The vehicle may determine the uncertainty in its perception system and use this uncertainty value to make decisions about how to maneuver the vehicle. This system uses information from other vehicles that are visible using a camera placed on the roof of the vehicle. If a large vehicle is in front of the car, information beyond the large vehicle is not available.

What is needed is a driver trajectory projection application. This document discloses an application where a user can observe a subject, active the application and project the possible future path of the subject driver to notify others in the vicinity.

BRIEF SUMMARY OF THE INVENTION

The present disclosure provides various embodiments of systems and methods for moving object predictive locating, reporting, and alerting, described herein. For one example, the present technology may be embodied as an application (i.e., an "app") where the application can project the potential current and future paths and locations of objects and notify individuals and other systems that may be impacted, or that are interested in obtaining this information, as detailed further herein.

In various embodiments, an example method includes receiving moving object data corresponding to a moving object; receiving sensor data from a sensor; and merging the received moving object data and the received sensor data into a set of merged data. The example method further includes based on the set of merged data, automatically determining one or more of a predicted location or range of locations for the moving object, a potential path of travel for the moving object, an alert concerning the moving object, and providing the alert. The automatically determining may be further based on one or more historical traits concerning the object, and the geographic medium the object is moving through. The geographic medium may include one or more of terrain, air, water, and space. The object may be an aircraft, soldier, vehicle, or drone. As described further below, the object may also be ballistic.

In other embodiments, the method includes identifying a specific type for the moving object; receiving historical traits and trends associated with the moving object, including statistical movement characteristics of the object, the statistical movement characteristics including acceleration and speed ability of the identified object; and adjusting the maximum acceleration, maximum speed, and maximum reachable range for the object as a function of geographic mediums that the object will move through in time over the projected course and trajectory of the object. In some embodiments, the method considers average speeds a particular object may traverse a particular medium.

In some embodiments, the present technology is a system that provides a service where inputs are received from third parties and outputs are provided to those or to other third parties. Inputs could include all types of sensor data pertaining to users and moving objects and outputs provided could be a merged data set as well as additional information generated by the system pertaining to approximation and estimation of future location, proximity, trajectory and routing.

In some embodiments, the present technology operates with a traffic or mapping application. The application takes advantage of existing mapping and traffic routing programs. It can blend the potential subject vehicle with existing traffic patterns and road conditions. A moving visual representation can be visible on the screen of the mobile device. Based on the speed of the trajectory information is updated with unique relative projection/trajectory algorithms. All known routes can be highlights on the mobile device in a color and can be set based upon an adjustable time set point.

In some embodiments, the present technology collects reports from multiple observers or sensors and blends the information to update proximate connected users and cancel or stop projections to people that could no longer affected. As other observers or sensors add to the information, some projected routes are cancelled or amended.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

| | | | |
|---|---|---|---|
| 16 | lanes | 17 | shoulder |
| 18 | divided | 19 | highway |
| 20 | user | 21 | driver 1 |
| 22 | driver 2 | 23 | motorcycle |
| 24 | driver 3 | 25 | driver 4 |
| 26 | driver 5 | 27 | linked user |
| 28 | linked user | 30 | subject vehicle |
| 31 | potential hazard | 32 | potential hazard |
| 33 | potential hazard | 40 | interchange |
| 41 | off ramp | 50 | hazard driver home |
| 54 | driver 3 home | 60 | mobile device |
| 61 | subject vehicle type | 62 | speeding |
| 65 | relative speed | 66 | relative speed display |
| 67 | License | 68 | license entry |
| 69 | enter | 70 | distance rings |
| 80 | User selects application | 81 | Information entry screen |
| 82 | Data entered | 83 | phone sensor data |
| 84 | Camera | 85 | Merge data with GPS |
| 86 | Application merged with mapping | 87 | Calculate future path |
| 88 | Determine relative positions | 89 | Calculate potential interaction |
| 90 | compared to threshold | 91 | Send warnings |
| 92 | distance and position | 93 | prompt |
| 94 | distance and position | 95 | type and instructions |
| 96 | trip information | 97 | user GPS location |
| 101 | screen | 102 | screen map |
| 110 | heading | 111 | North |
| 112 | angle | 114 | heading |
| 120 | tilt angle | 121 | tilt angle |
| 130 | trajectory | 131 | spread |
| 140 | potential object | 200 | area |
| 300 | screen | 400 | screen |
| 500 | screen | 600 | screen |
| 700 | screen | 800 | flowchart. |

In some embodiments, the method can calculate the movement of an object in any predictable direction based on the movement range and characteristics of that object, including rate of acceleration and range of speed. Such embodiments may aid, for example, in the tracking of drones that could pose a danger to passenger aircraft, vehicles, or people.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

It will be further understood that several of the figures are merely schematic representations of the present technology. As such, some of the components may have been distorted from their actual scale for pictorial clarity.

Tracking and alerting drivers to traffic accidents, road construction, police presence, and stationary, fixed objects is used to guide drivers to the most time efficient route to get to their destination. Moving hazards present particularly difficult problems for tracking and alerting.

It should be appreciated that the present technology is not limited to the objects being hazards; other objects may be moving and processed to the present technology. In addition, although some examples herein are described with respect to moving hazards that a driver could encounter on the road, the present technology is not limited to that type of moving hazards.

Studies have shown that excess drinking and driving can be a deadly combination and cost us an estimated to be $37 billion per year. The statistics are staggering: one in three accidents involve an alcohol-impaired driver; between midnight and 3 a.m., drunk driving crashes kill someone every 23 minutes; in 2010, 10,228 people died in alcohol-impaired driving crashes (one every 51 minutes); the most frequently recorded blood alcohol content (BAC) level in fatal crashes was 0.17 which is more than twice the legal limit; and every day 29 people are killed in drunk driving crashes and 1,440 people are injured. Clearly, there is a need to address the hazard of drunk drivers.

The objects that might be encountered include but are not limited to drunk or otherwise impaired drivers, texting drivers, kidnappers of missing children (e.g., "Amber" alert), battlefield objects, hiking encounters (e.g., predatory animals), in flight obstacles and hazards, maritime obstacles and hazards, and underwater dangers, to name just several possibilities.

Various embodiments of the present technology provide systems and methods for moving object predictive locating, reporting, and alerting, described herein. For one example, the present technology in some embodiments may be embodied as an application where the application can project the potential current and future paths and locations of objects, an individual, group of individuals, vehicle, group of vehicles (to name some non-limiting examples), and notify individuals and other systems that may be impacted, or that are interested in obtaining this information. In another embodiment, the present technology can be utilized via a web browser, a corporate network server, the cloud, etc.

The present technology can also be configured to provide graphics in three dimensions and/or configured for virtual reality or augmented reality interaction.

Figure 1:
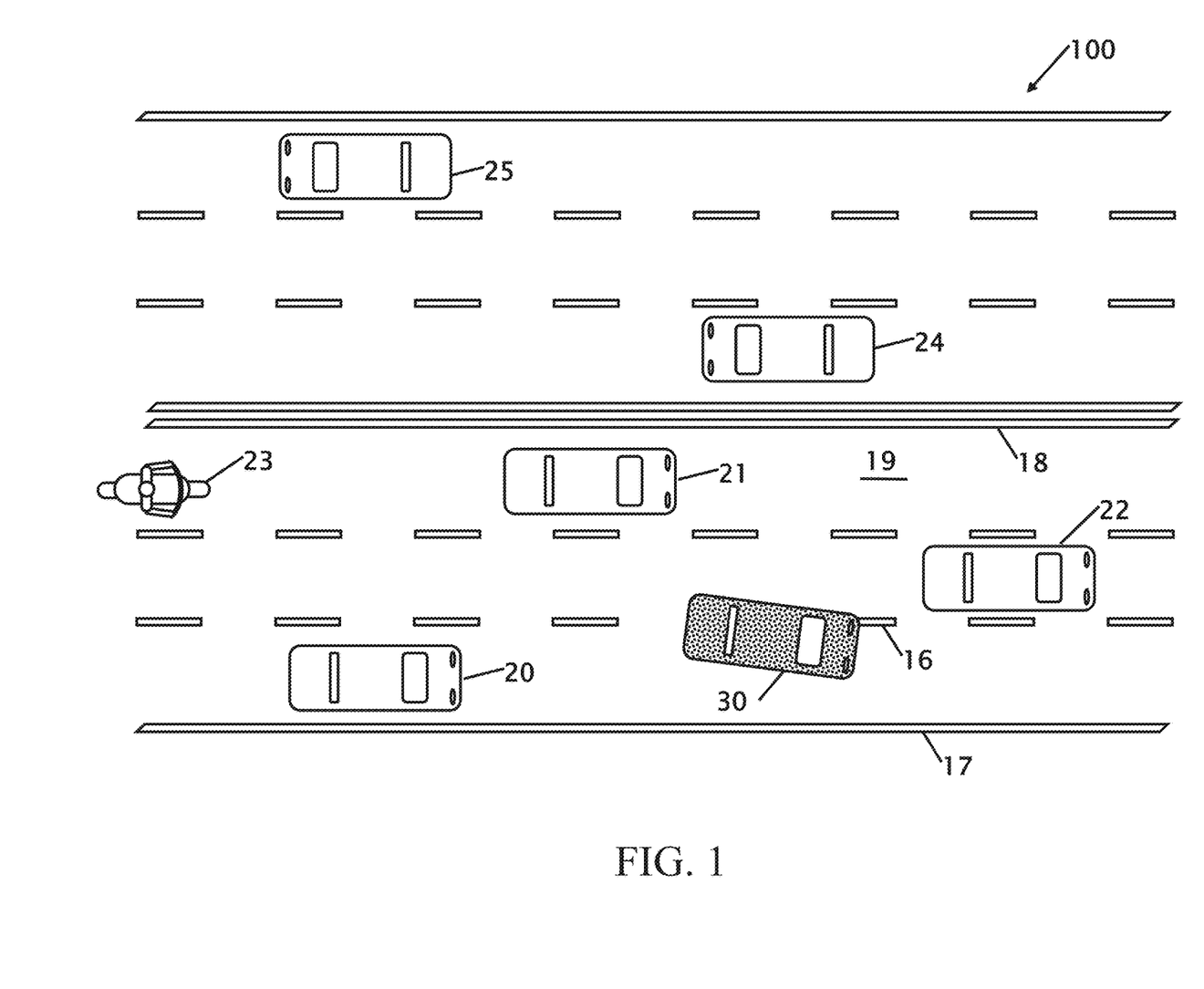
FIG. 1 illustrates an example plan view of a freeway with a moving vehicle type hazard and other vehicles, according to an example embodiment.

FIG. 1 is an example plan view of an area 100 that includes a freeway 19 with a moving object being in this example a moving vehicle type hazard 30. FIG. 1 also shows on freeway 19 other vehicles in the vicinity of the hazard identified according to an example embodiment. In the example in FIG. 1, the freeway 19 is a divided roadway with three lanes 16 of traffic in each direction of travel and a shoulder 17. In this example, a primary user 20 observes a subject vehicle 30 which may be variously a slow vehicle, a weaving vehicle, a wrong way vehicle, a vehicle driven on the shoulder, etc. The subject vehicle 30 can potentially cause harm to the primary user 20 and potentially to another vehicle.

In assessing the threat posed by the subject vehicle, various embodiment consider several indicia for drunk drivers may include, quick acceleration or decelerations; swerving, weaving, or zig-zagging across the road; stopping or turning abruptly or illegally; nearly hitting an object like a curb or another vehicle; drifting in and out of lanes or straddling multiple lanes; driving slower than 10 miles per hour below the speed limit; driving with headlights off at night; and driving on the wrong side of the road or anywhere that is not on the road; to name several non-limiting examples. Such indicia are weighted in determining the priority of a moving object that may be a potential hazard. For example, determining that the subject vehicle nearly hits an object on the road may be higher priority and hence given more weighting than quick acceleration. Similarly, determining that the subject vehicle is driving on the wrong side of the road is much higher priority and thus weighted more than determining the subject vehicle is accelerating. Moreover, if the subject vehicle is driving on the wrong side of the road and is driving on the side of the road of the user, it will be given much higher priority and thus more weight than if the user was driving on the opposite side of the road from the subject vehicle. Similarly, the number of confirming reports from additional users or sensors can increase the priority and weight for determining the potential hazard and potential interaction with the hazard. In addition, if a moving object is a hazard and is identified and reported by multiple observers or sensors it can then be confirmed with increasing likelihood and as a high-level priority. For example, if ten users of the technology report a wrong way driver within ten minutes within a twenty mile stretch of road then the priority/weighting of the hazard could then increase.

It may be determined in various embodiments that in addition to the primary user 20, the driver 21 and the driver 22 are also in imminent danger from the subject vehicle 30, but other vehicles in the vicinity may not be. It should be appreciated that objects such as vehicles shown in FIG. 1 are identified by their occupant driver; however, certain vehicles could be autonomous self-driving vehicles having no or some passengers therein.

In the example in FIG. 1, the motorcycle 23 may be far enough in back of the subject vehicle 30 that the rider of motorcycle 23 should be able to presently observe the subject vehicle 30, not be in immediate peril, but might be imperiled in the future. Driver 24 and driver 25 are traveling in an opposite direction and should not be affected by the unsafe actions of the subject vehicle 30, unless on an undivided roadway, or the subject vehicle 30 changed directions and veered over the divider 18, for example. Driver 22 is ahead of the subject vehicle 30 and may not be aware of the subject vehicle 30, but if the subject vehicle 30 was speeding, an accident could still occur between the subject vehicle 30 and driver 22.

Figure 2:
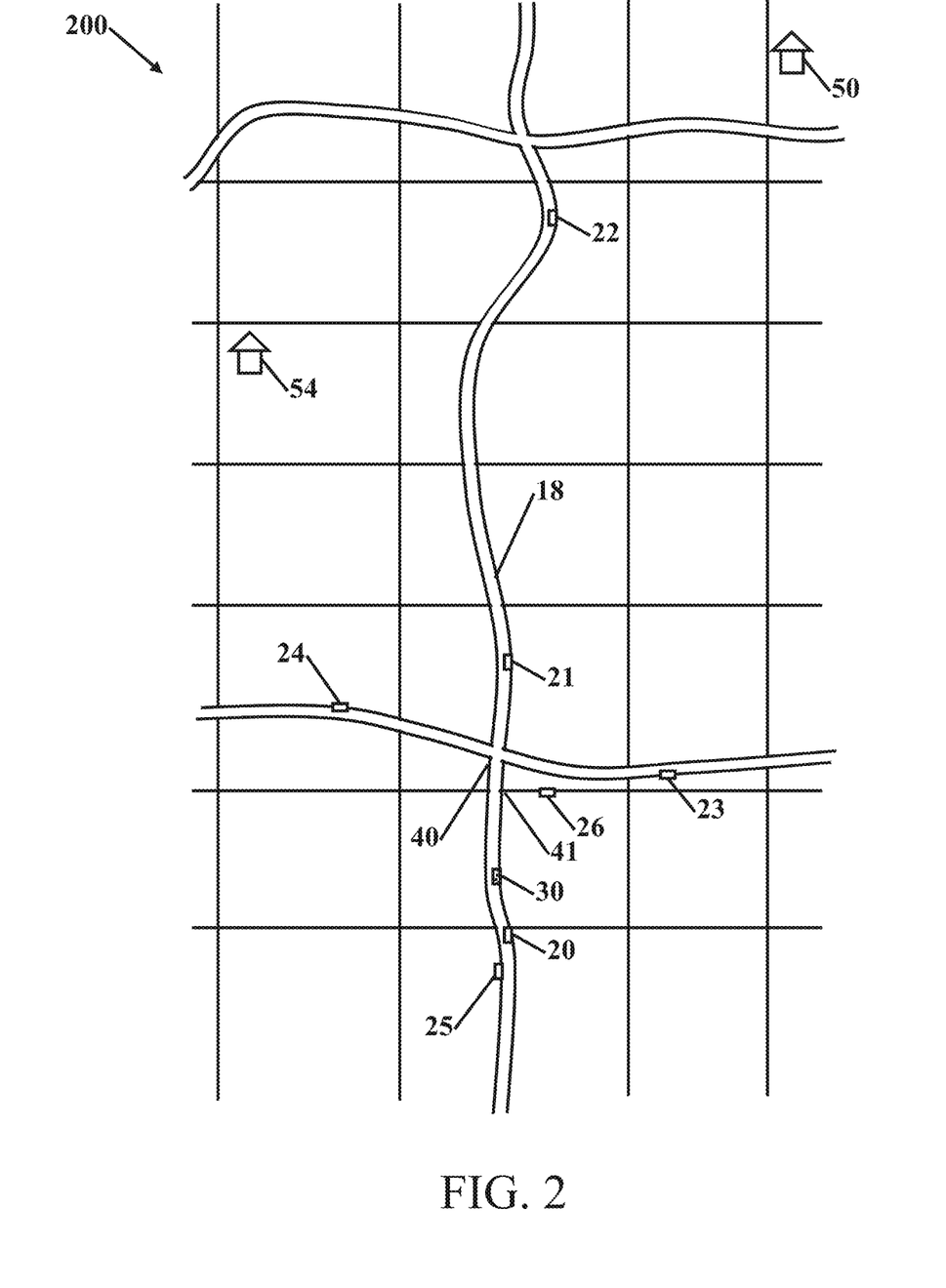
FIG. 2 illustrates a plan view of an area that includes a freeway along with a street map/grid with adjacent roads and freeway portions, according to an example embodiment.

FIG. 2 shows a plan view of an area 200 that includes a freeway 18 along with a street map/grid with adjacent roads and freeway portions, according to an example embodiment. In this example, the subject vehicle 30 has been observed by the primary observer 20. In operation for this example, the primary observer 30 would activate the application that runs in accordance with various embodiments of the methods of the present technology. The primary observer can then enter or select relevant information about the subject vehicle 30 such as, but not limited to, the speed, direction of travel and type of subject vehicle 30 and optionally the license plate of the subject vehicle 30.

In response to the entry/selection, the method can notify other drivers that could be affected by the object, i.e., subject vehicle 30 in this example. The notification can be based upon various factors which may include the proximity to the subject vehicle 30 and the type or categorization of subject vehicle 30. In the example in FIG. 2, the direction of travel of the subject vehicle 30 is approaching an off-ramp 41 and an interchange 40. In various embodiments, a moving visual representation of this is displayed on the screen for the user, e.g., the primary observer 20 or others. The representation and various embodiments may run variously on a mobile device, a device built into the vehicle, or some Internet of Things (IoT) device, etc. Based on the speed that is determined for the subject vehicle and the user, e.g., primary observer 20, various trajectory information can be updated. The speed may be determined by various means, including but not limited to entry or selection by a user, or sensor data where the sensor may be on a vehicle, on the mobile device, or some other device. In various embodiments, all known routes that could be potentially traversed by the subject vehicle 30 and the user, primary observer 20 for instance, can be highlighted on the display in a color and appearance can be set based upon a selectable range and specification of the notifying application.

In the example in FIG. 2, based upon the present direction of travel, if the subject vehicle 30 is speeding, the subject vehicle 30 can potentially rapidly approach drivers 28, 23, and 24 on the freeway 18 and a driver 26 on a side street. Driver 25 is heading in an opposite direction (see FIG. 1) and so would not require notification in various embodiments. The proximity of driver 22 is more distant from the object (e.g., subject vehicle 30), but a potential for danger from this object still exists. Various embodiments consider the speed, routes, direction, and proximity among the various factors. In addition, another factor would be whether the subject vehicle 30 was a drunk driver or a slow driver. In this example, the potential of affecting driver 22 may be very remote based on the distance from the subject vehicle 30. As the subject vehicle 30 passes the interchange 40, various embodiments would no longer notify any of the user/drivers who are no longer in the direction of travel or immediate area of concern. However, subject vehicles or other objects can be monitored by more than one sensor, sensor location, or reporting observer, and hazardous conditions and changes in subject trajectory and speed can be reported and updated by the system, providing updates to the alerted users, newly alerted users, and subscribers to the system.

In some embodiments, the primary observer 20 can enter a vehicle license plate or the primary observer 20's vehicle or device may be equipped with sensor(s) such as, but not limited to, a camera that could detect the subject vehicle 30's license plate, in addition to other automated ways of identifying subject vehicle 30's unique and semi-unique characteristics. In response to determining the vehicle license plate and other characteristics by whatever means, various embodiment utilize the vehicle license plate to obtain data which would provide a potential destination to use to map the subject vehicle 30 to the subject vehicle 30's home or work 50. If the projected travel path from the subject vehicle 30 to the home or work 50 of the subject vehicle 30 if known (based on vehicle license plate databases, etc.), and based on other methods of determining subject vehicle 30's route or destination, vehicles that are less likely to be affected by this projected travel path, such as vehicles 24 and 26, might not be notified (alerted) since it can be determined by the method that these vehicles may likely not be affected by the subject vehicle 30. In addition, in some embodiments, if the home or work location 54, or other destination or route, of the driver 24 is known, the potential of interaction between driver 24 and the subject vehicle 30 may be unlikely because driver 24 will soon exit the freeway as he or she progresses home. Thus, some embodiments can reduce excessive false warnings, e.g., by filtering based on the likelihood of an interaction in the foreseeable future.

In the example of FIG. 2, as the subject vehicle 30 passes driver 28, various embodiment allows the driver 28 (or other sensors able to identify subject vehicle 30) to update system data regarding the subject vehicle 30, e.g., regarding location. For example, based upon an updated location of the subject vehicle 30 being just past the driver 28, various embodiments determine that the need to notify driver 22 (ahead in the travel path) increases, while it may also be determined that the risk to drivers 23, 24 and 26 is virtually eliminated. The probabilities associated with the risk may be calculated by various embodiments based on the factors mentioned above and below.

Continuing with the vehicle hazard example, the method according to various embodiments of the present technology may be configured to run as an application ("app") on a device.

Although apps and various other aspects may be described in examples with reference to a mobile device, other devices including those built into the vehicle or other object, or IoT devices of some kind, to name a few non-limiting examples, may also be used to practice the present technology according to some embodiments.

Figure 3:
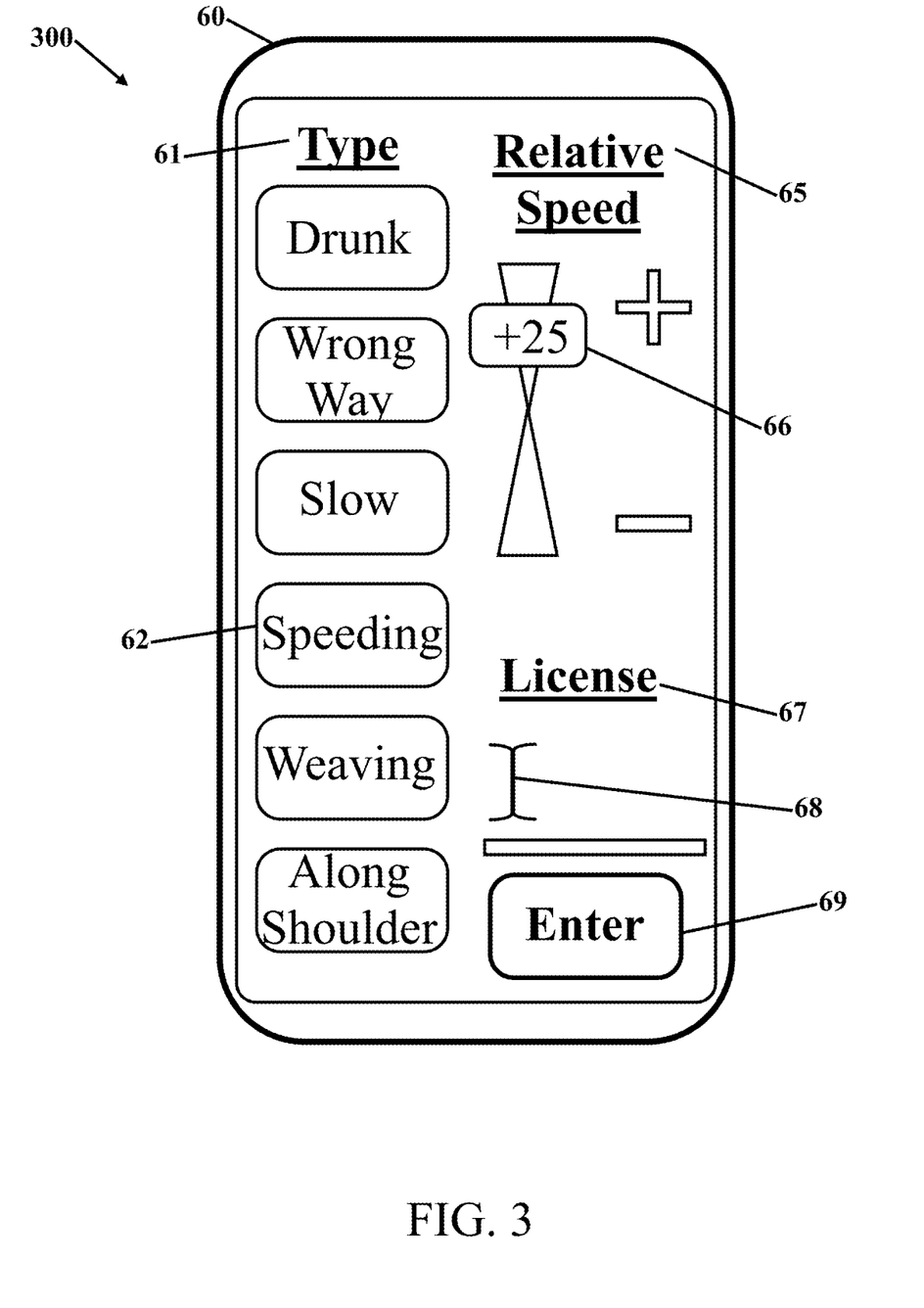
FIG. 3 illustrates an example entry screen for an application for a method operating on a mobile device, according to various embodiments.

FIG. 3 illustrates an example screen 300 that shows a graphical user interface (GUI) provided by an application, according to various embodiments. The screen 300 screen is an example only for reference as a simplified display to enable a user to quickly enter information (e.g., to avoid the user from being overly distracted from the road). In this example, the information may be entered on a mobile device were using available sensors on the mobile device (and/or proximity to base stations or other known objects) the present location, direction of travel, and speed of the mobile device is known. This use of available data apart from user entry/selection can substantially reduce the information that a user needs to enter and/or select. Although the information may be referred to herein as entered, the entry may comprise selecting information, such as selecting an icon such as "speeding" 62. The entries can be aggregated or merged with existing mapping, Global Positioning Satellite (GPS), and other information including information from other sensors the vehicle or mobile device may have. The application for performing the method according to various embodiments can allow an observer to notify others that a hazardous vehicle is in the area or may be approaching other people in danger. In one example, the observer can simply open the application, and with a few selections can enter relevant information into the application as will be explained further below.

In the example shown in FIG. 3, on the screen 300 of the mobile device 60 display for the application, the primary observer 20 can selects the subject vehicle type 61 of subject vehicle 30. For example, the speeding 62 type may be selected. In addition to speeding 62, other types shown in the example GUI include drunk, wrong way, slow, weaving, and along shoulder. Several of the types may be exhibited by a drunk driver. The screen 300 can have a slider for indicating the relative speed 65. As the slider is moved in response to user action, the speed display 66 can show the perceived or relative speed 66 ("+25" in this example). The user action may be a touch, spoken command, and the like. Based upon this information and other acquired information or determinations, the method for the application can predict the direction of travel (e.g., relative to the primary observer 20 or others) and when the subject vehicle 30 may approach other drivers, off ramps and freeway interchanges.

The example application screen 300 may also include an interface for the user to provide vehicle license plate information, e.g., "license" 67. The example screen 300 shows an optional location for entry 69 of the license plate information 68 of the subject vehicle 30. In response to selection of this area by a user by touch or spoken commands, etc., various embodiments will display a keyboard which the user can use to enter the letters, number and symbols for the license plate as well as availability to utilize a devices camera and optical character recognition (OCR) technology to obtain license plate data. In various embodiments, this license plate information can be compared to the state department of motor vehicles accessible database to obtain the owner, color, make and model of the subject vehicle 30. In some cases, the home address, work address, or route may be obtained also by the system to help determine a possible predicted destination for the subject vehicle 30. In some embodiments, the home address, work address, route of subject vehicle 30 or other information obtained, based on the license plate information and other information, including but not limited to facial recognition, may be used to also obtain a business address, and addresses of relatives associated with the subject vehicle 30 or other information useful in determining route or future destination. This information may be referenced to predict potential destinations where the subject vehicle 30 may be heading. In some embodiments, the sensor used may be a camera, and the method can receive a photo of the subject vehicle 30 taken by the primary observer 20 using a mobile device 60's camera(s) or using a camera in the vehicle to capture an image or video of the vehicle license plate number of the subject vehicle 30, and the GUI can provide a portion to support image capture. In other embodiments, a provided user interface (and/or remote sensors) can enable an observer to select descriptive information about the vehicle, including but not limited to make, model and color, which can also be deduced utilizing image recognition technology. In some embodiments, other descriptors for the subject vehicle can be obtained by sensor(s) including, but not limited to, damage, dents, level of cleanliness, stickers, and other aspects that could alone or together with other aspects, be helpful to identify the subject vehicle 30.

In response to actuation of the enter button on the GUI 300 in this example, various embodiments can determine the proximity and potential of another user encountering the subject vehicle 30. In some embodiments, other drivers can setup to be linked to receive alerts (akin to an Amber alert or tornado warning alert) based on inputs from the primary observer 20 and/or remote sensors and determinations made therefrom and from sensor data, to alert the other drivers of particulars about the subject vehicle 30 and the respective likelihood of an encounter for that other driver. Various embodiments are particularly helpful if the subject vehicle 30 approaches from behind a vehicle such that the vehicle or driver may not be as cognizant of the moving object. Other drivers can also use the application, and autonomous sensors can confirm presence of and potential for an encounter with the object and provide the system with additional data with which to update information related to the subject vehicle 30 (hazard type of moving object).

Figures 4, 5:
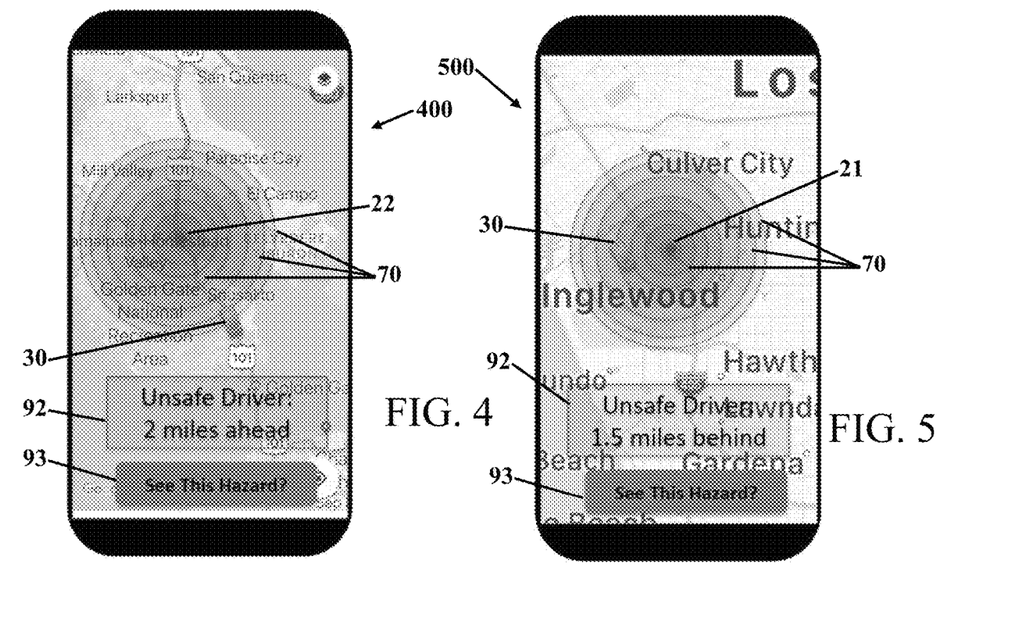
FIG. 4 illustrates an example screen that can be presented to a user in response to determining an unsafe driver is located, moving, and ahead of the user, according to an example embodiment.
FIG. 5 illustrates an example screen that can be presented to a user in response to determining that an unsafe driver in a subject vehicle is located, moving, and is presently behind the user or driver, according to an example embodiment.

FIG. 4 shows an example screen 400, for a device, presented to a user in response to determining that a moving object (hazard) is observed at point 22 and is presently ahead of the user. Various embodiments may present the hazardous object with a moving visual representation of its predicted location along a route between the hazardous object and an alerted user that will be visible within the application. The method may achieve this based on calculating the relative speed/trajectory information by determining a distance and relative position which may be presented at 92 and updated. The example screen 400 can show a series of distance areas 70, in the form of concentric circles or polygons that become increasingly intense based upon the proximity to the object. In some embodiments, a polygon effect is used which equates to a reachable range in any direction over time based on the deduced capabilities of the identified object. The distance areas 70 may be shown in red or could be a different color based upon the type of object and the weighting of any potential interaction. The color could be customizable by a user or alert provider (i.e., service subscribing entity) depending on their preference. The example screen 400 also provides a prompt 93 to allow for user input to update information on the object that is relayed to the system and can be relayed to other application users and entities receiving data from the service.

FIG. 5 shows an example screen 500, for a device, presented to a user in response to determining a moving object (hazard) is observed at point 22, and is presently to the east of the user or driver 20. The screen 500 shows a series of distance areas that become increasingly intense based upon the proximity to the object. The distance and position of the moving object that is a potential moving hazard may be presented at 92, shown relative to the position of the device that is running the application in accordance with various embodiments. In FIG. 5, the areas 70 may be shown in red for emphasis but could be a different color based upon the type of object (i.e., type of hazard) and weighting of any potential interaction, with the color customizable by the user or third-party service provider. As an example, a drunk driver may be deemed to be greater hazard than a slow-moving vehicle. Both moving objects have a potential for danger and unpredictability, but the potential for the drunk driver to weave, get into an accident, and cause injury can be far greater. The screen 500 also provides a prompt 93 to allow for user input to update information on the object that can be relayed to other application users and entities receiving data from the service.

Figure 6:
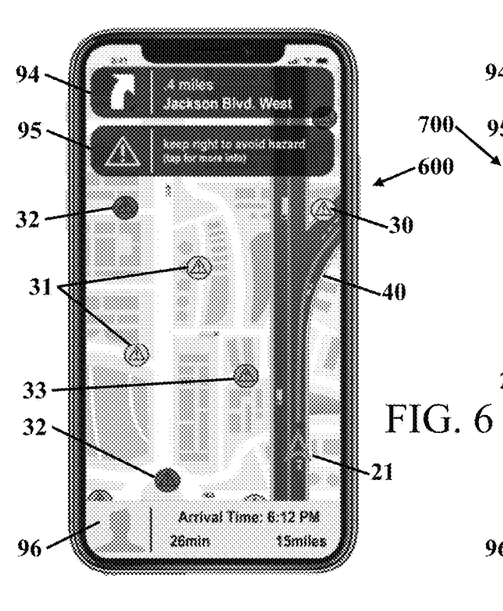
FIG. 6 illustrates an example screen presented to a user in response to determining that a user is approaching a moving object, according to an example embodiment.

FIG. 6 shows an example screen 600 presented to a user in response to determining that a user (e.g., driver 21) is approaching a moving hazard type of object. In various embodiments, the application (per the corresponding method) collects reports received from multiple drivers and integrates the information to update proximate drivers determined to be potentially affected and also to cancel projected hazard trajectories for users that are determined to be no longer affected. As other drivers add to the information, some projected routes can be cancelled in response to determining that the subject vehicle has changed from one road to another, e.g., changed freeways or exited a freeway. In various embodiments, the warnings generated for providing to other drivers are localized for the subject vehicle's proximity to the hazard and are determined as a function of characteristics of the hazard, e.g., a slow, weaving drunk driver, a wrong way driver, a driver on the shoulder of the road in stopped traffic, motorcycle, fire truck, ambulance or a speeder weaving around drivers to maintain a higher rate of speed, to name just a few examples.

Screen 600 in the example in FIG. 6 shows multiple examples moving potential hazards 30-33 in proximity to the driver 21. In various embodiments, each hazard 30-33 type is moving and is identified with a different color code based upon the potential severity of the hazard. For screen 600, the driver 21 is shown approaching a hazard 30 which is along the guided trajectory, which is generated according to the method in various embodiments, because the method determined that the driver 21 needs to pass through the interchange 40 based on the route driver 21 is taking. Screen 600 provides an alert 95 that shows the hazard type and provides instruction to advise the best lane to follow to avoid the hazard based upon information provided by other users. The alert 95 in this example has a prompt to allow the user to tap for more information. It should be noted that, in this example, the method determined that some of the moving potential hazards 31-33 are not in the determined travel path of the driver 21. Although these moving potential hazards 31-33 may have minimal or no effect of the driver 21, the driver (or passenger) may be able to observe the hazards 31-33 so various embodiments allow the user to update or append information related to the hazards. Screen 600 also shows trip information 96 which may include the estimated time that the driver will arrive at their destination, number of miles and amount of travel time. In various embodiments, the determination of the user's destination based will reduce updates on other moving potential hazards 31-33 because it can be determined that those potential hazards are unlikely to affect the travel trajectory that has been determined for the driver 21. Screen 600 also shows at 94, in this example, the upcoming distance to a turn and identifies the turn along the project route of travel.

In various embodiments, the determination of the travel trajectory can be based on the route and destination for the user. The destination can be determined variously, for example, based on navigation system communication, user input/selection, or predicted based on historical data that can show a pattern of having certain destinations at the time and place of the trip, based on past destinations for the route taken, based on the user's calendar or other information the user had provided, with different weights given to the information depending on the source of the information, e.g., less weight to destinations based on distant history and more weight to destinations based on the venue for an event on the user's calendar accessible from the mobile device, for instance.

For movement prediction in various embodiments, the form of movement needs to be matched with the polygon representing calculated potential locations within a determined timeframe based on mobility physics of the object for example a person can physically run at maximum measured maximum speed of nearly 28 MPH (e.g., world's fastest runner Usain Bolt in the 100-Meter Sprint). The average vehicle has an average maximum speed of between 100-120 miles per hour. In various embodiments, the method calculates the average maximum speed of an identified object/ person/vehicle, along with conditions of the object's terrain and the limited mobility and speed based on same (i.e. hills, pavement condition, curves in road, etc.) and calculates the maximum acceleration rate of a moving object (which could be a person, vehicle, or other object) along with its average calculated maximum speed and adjusts the algorithm in real time using the actual geo-location and relative movement against this algorithm to determine the earliest potential opportunity for an encounter (e.g., with the moving hazard, person, vehicle, etc.,). The algorithm can also adjust estimations in real-time based on all possible locations that the identified object/person/vehicle could have been. This can create a level of awareness for all users that will allow for appropriate preparation of possible encounter.

Figure 7:
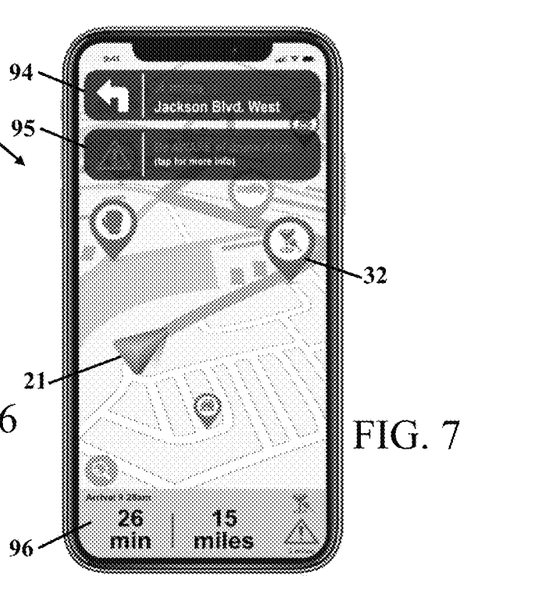
FIG. 7 illustrates an example screen presented to a user to route around a potential object in response to determining that the potential object was in the route the user had been taking, according to an example embodiment.

FIG. 7 shows an example screen 700 presented to a user to route around a potential hazard (in response to determining that the potential hazard was in the route the user had been taking). In various embodiments, the system is configured to provide a database (or other data structure) that can be quickly cycled through to identify specific object type with associated predictive historic traits/trends including statistical movement choices in space as well as known acceleration and speed ability of identified object, e.g., to provide the ultimate alert/warning system.

Additionally, the app can take into consideration, through the app's predictive algorithm and geographic system, the medium an object will move through in time including air/water/space etc. and adjust the maximum acceleration and top speed of maximum reachable range according to the known substance being traversed by the object.

In various embodiments, the application uses traffic patterns and travel times on each street, highway, or road, and in addition, tracks moving hazards and moving potential hazards to, alert to the potential hazard type and instructions 95 in FIG. 7 and trip information 96. All known routes of the potential hazardous can be highlighted to further alert the user. While a recent accident may not generate a present delay in traffic speeds, a moving hazard can present different challenges so in various embodiments, a driver 21 that is approaching a hazard 32 along their route, will be re-routed or at a minimum be alerted before they encounter the hazard 32. On screen 700, the hazard is identified by a drink icon; other appropriate icon warnings may be used to identify various hazards.

Figure 8:
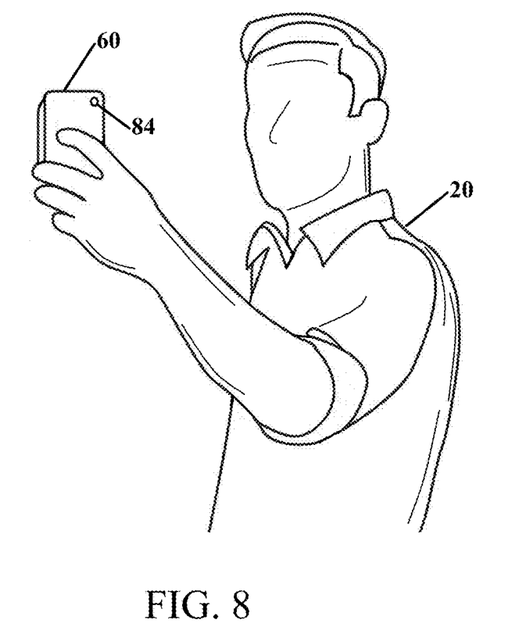
FIG. 8 shows a user capturing movement of a moving object.

FIG. 8 shows a user 20 capturing movement of a moving object using a mobile device 60. The mobile device has a camera 84 that can capture an image or movie on the moving object. The mobile device 60 has sensors that include a GPS sensor that determines the location of the user 20. The mobile device 60 also can have sensors that determine the direction (compass heading) the camera 84 is facing along with the angle of tilt for the mobile device 60. Combining these sensor(s) data provides a heading, direction and tilt angle where the mobile device 60 is facing. The information is collected without requiring entry by the user 20 and can be sent to the server. An example of collecting the moving object is shown and described with other figures and text herein.

Figure 9:
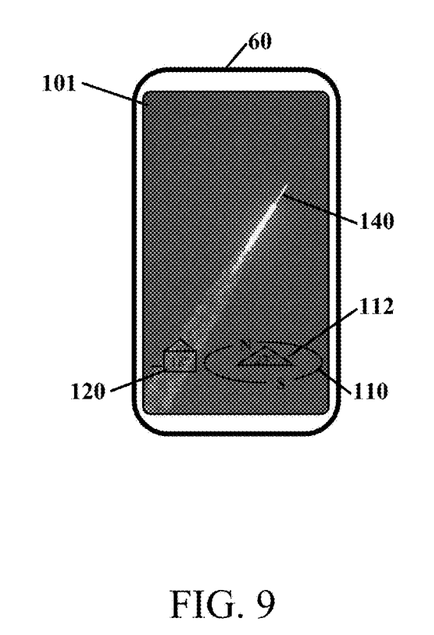
FIG. 9 shows the captured potential object.

FIG. 9 shows the captured potential object 140 on a screen 101 of the mobile device 60. The application is shown with heading and angular information superimposed on the screen 101. In this example the heading 110 with the heading angle 112 that is updated as the mobile device is rotated. The elevation or tilt angle 120 is also shown on the screen 101. Combining information from the sensors provides a heading 110, direction and tilt angle 120 where the mobile device 60 is facing and direction of travel of the potential object 140. When multiple images or a movie capture and tracks the potential object 140 a more accurate trajectory can be calculated. The trajectory can be calculated locally and shown on the screen of the mobile device and transmitted to the server for determining notification to others based upon their notification threshold.

Figure 10:
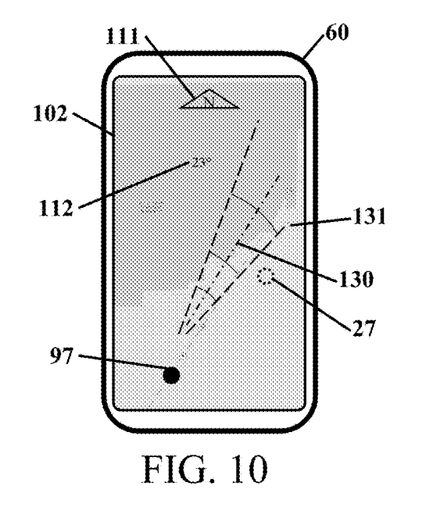
FIG. 10 shows the estimated trajectory on a map.

FIG. 10 shows the estimated trajectory on a map on the screen map 102 on the mobile device 60. This screen map 102 shows the user GPS location 97. Maps are nearly always shown with North 111 at the top of the map, but a user may wish to rotate the map orientation and a North 111 indication provides a reference. In this screen map 102 image the trajectory 130 is indicated with a potential spread 131 based upon the limited one-point collection of information. The trajectory angle 112 from the potential object 140 in the previous figure is shown. This figure shows a linked user 27 that is outside of the projected trajectory. Based upon the level of notification, linked user 27 may be notified or they may be prompted by the server to observe and provide a second observation of the trajectory of the potential object.

Figure 11:
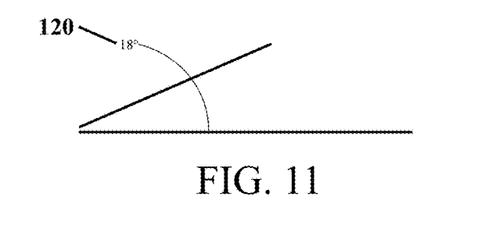
FIG. 11 shows an angle of elevation.

FIG. 11 shows an angle of elevation. Because the tilt angle 120 of the potential object was collected, without additional information about the travel distance or apex of trajectory, a potential landing location can't be determined, but warning to other users can be sent to the server that determines a potential for conflict based upon a notification level.

Figure 12A:
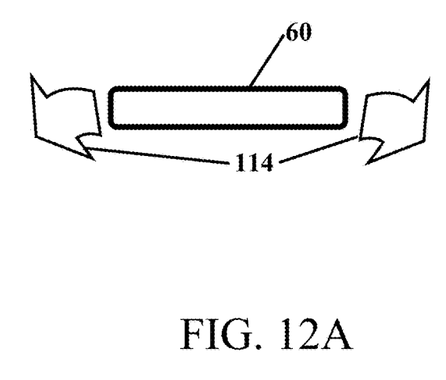
FIGS. 12A and 12B show angular movements of the mobile device.
Figure 12B:
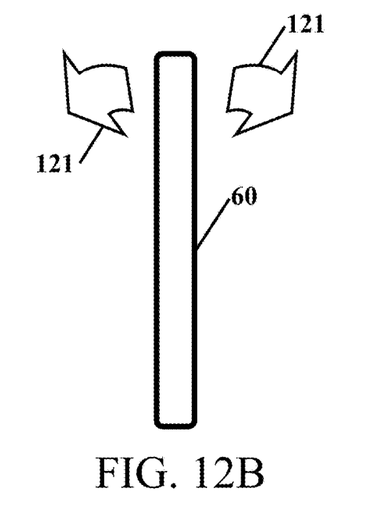

FIGS. 12A and 12B show angular movements of the mobile device 60. FIG. 21A is a top view of the mobile device and the angular or heading 114 and heading changes are measured by sensors within the mobile device. FIG. 12B is a side view of the mobile device 60 and tilt angle 121 and tilt angle changes can be determined.

Figure 13:
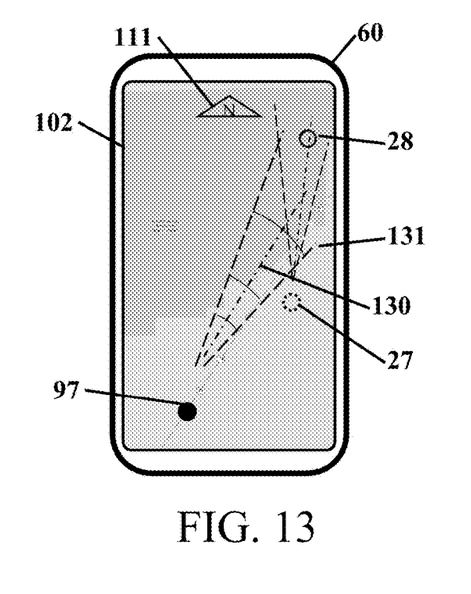
FIG. 13 shows bending of data of the moving object from data collected from two observers.

FIG. 13 shows bending of data of the moving object from data collected from the additional (second) observer 27. In this figure, the information from two observers 97 and 27, who were both outside of the path of the potential object, has been combined by the server to improve the travel or trajectory of the potential object. An additional linked user 28 is shows directly within the path of estimated travel from the at least two observers 97 and 27. While an airborne potential object may pass over the top of the linked observer 28, a ground moving vehicle, troop, drone or other potential object has a high potential for interaction with the linked user 28 thereby providing advanced notice before the potential object is observable by the linked user 28. In the case of a surveillance drone the linked user 28 may camouflage or take cover to avoid detection. The notification from the server is based upon a threshold set by linked users.

The threshold can be time based for advance notification, distance to a path of travel of the potential object and may only be notified if the potential object is observed by more than one user or observer that is outside of a physical distance from the linked user based upon the GPS location. The moving hazards (or other objects), along with type of moving object hazard and which may include additional available information such as report time, report minutes ago, report location, predicted location, estimated time of encounter, etc., and allowing a user to select a moving object hazard in order to view more information and data on a map view. Determining a potential path of travel comprises calculating an area from the predicted location or range of locations for the in air moving object and determining whether one or more other objects are located within the area. This also includes determining potential for interaction of the in air moving object with the other or more other objects, comparing the potential to a threshold, using a result of the comparing to determine a level of notification to provide for an alert, and providing the alert at the determined level of notification.

Figure 14:
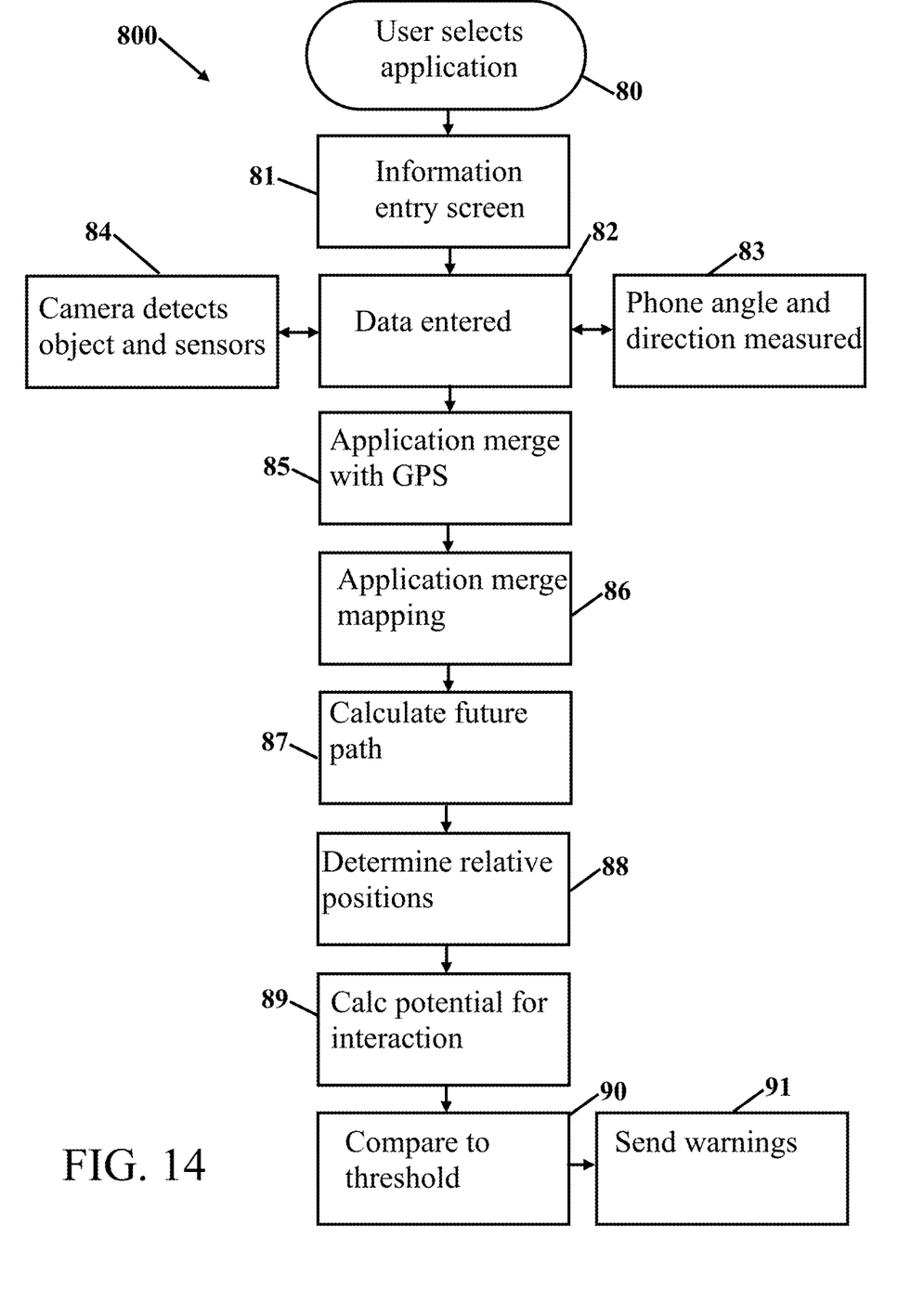
FIG. 14 illustrates a block diagram of an operational flow chart according to some embodiments.

FIG. 14 illustrates a block diagram of an operational flow chart for a method where the hazard is a moving vehicle in the air or on a roadway, according to some embodiments. A user selection of the application is received at 80. A warnings-only mode can be provided, whereby the application can run in the background, alerts can be sent and received as notifications, alerts can be sent and received as text messages, or alerts can be sent and received within other applications, providing warnings as determined according to various embodiments described herein. Upon initialization of the program or within application settings options may be presented to the user for selecting the sensitivity for notifications, e.g., selecting various setpoints. For example, at a low level the user has the option to only be notified when an airborne object is approaching from the rear at a relatively close distance as determined by various embodiments. Many ground vehicle can be observed from dust generation, sound or ground vibration. The methods and system in various embodiments can also provide the option for the user to select a high level of user notification and specify a distance such that a notification will be generated and sent to the user for any reported moving objects of concern such as, for instance, any reported hazards within that distance of miles (e.g., where the user is in an unfamiliar area with potential for various unseen objects). Based on additional embodiments, such settings may be determined by a third-party subscriber to the system that is providing data to their users and customers.

In some embodiments, the application may be provided to the user on the mobile device or preinstalled on the user's mobile device or within the vehicle, e.g., by an insurance company or the vehicle manufacturer or vehicle owner (other than the driver) who owns or otherwise controls the software for the application. The insurance company, for instance, may want the application settings to have setpoints that are broader and to allow the application to disable the driver from adjusting those predetermined setpoints.

After initialization of the program and based on selections, if any, of options by the user as permitted or predetermined settings, the application can provide an information entry screen for display to the user. The items on the screen that the user can adjust may vary depending on the options selected. Screen 300 in FIG. 3 shows an example of an information entry screen. In addition to the camera capture and trajectory, the application allows the user to enter certain data on the information entry screen. The application can receive data entered by the user 82 as described herein in various embodiments.

While not required, a license plate of the moving object (e.g., of subject vehicle 30 in FIG. 2), for example, can be manually entered at 83 by the user or the sensors in the mobile device can communicate the phone angle and direction. Although a camera is mentioned at 84 as detecting the license plate, the sensor is not limited to a camera, other suitable sensors may be used that are capable of obtaining an image of the license plate or capable of determining the license plate number. The application can allow a driver (e.g., the primary observer 20 in FIG. 2) to take a photo or video of the moving subject vehicle. In addition, images can be taken by remote sensors, dashcams, and the like that are networked and connected to the service.

After the data, such as that shown for example at screen 300 in FIG. 3, is entered, the data can be merged, at 85 in with GPS information from the mobile device or vehicle. In various embodiments, the mobile device can determine location, direction and speed data for the mobile device and the primary observer 20 in FIG. 2 in the same vehicle, using various sensors.

At 86 in the data can be merged with mapping programs or applications locally or in the cloud. In various embodiments, the various merging provide capability that would be otherwise not available to the mapping programs, applications, users, or third-party subscribers to the data.

At 87 in the data can be used, locally or in the cloud, to calculate future path(s) of the subject vehicle 30 in FIG. 2, as described further herein in various embodiments.

At 88 the relative positions between the subject vehicle 30 in FIG. 2 and other drivers are determined according to various embodiments. Based at least in part on the distance, potential travel routes, and travel speed of the subject vehicle 30 in FIG. 2, as described in examples herein, the potential for interaction between the drivers and the subject vehicle 30 is calculated, locally or in the cloud, at 89. In some embodiments, other users are provided with an image of the subject vehicle 30 which will reduce the amount of input required from those users and allow for a quicker identification and verification of the subject vehicle.

At 90 in the example flowchart 800, the application will then compare, locally or in the cloud, the determined potential for interaction with a threshold set for notification to determine the level of notification to provide to the user. In response to the potential for interaction being determined to be above the set threshold, at 91, an alert (warning) can be generated for delivery to a subject user, e.g., displayed on the user's mobile device. The application will continue to monitor the moving objects (subject vehicle 30 shown in the examples in FIG. 1 and FIG. 2, and other moving hazards determined to have potential for interaction along the user's route, for example) and compare the potential interaction with the threshold to determine if the alert should continue to be displayed, additional alerts sent, or if the potential for interaction with the object is no longer present.

While in various embodiments a mobile device may be used, some embodiments of the methods and systems for the application may utilize static locations that include traffic cameras, for example, to determine a subject vehicle 30 from FIG. 2 and send notifications to subject users and data subscribers.

In other embodiments, the application can also be used to identify both moving and static objects or identify a subject vehicle that is emitting moving objects which are hazards such as releasing trash or dropping gravel.

Some embodiments may be used for warning pedestrians of a subject vehicle 30 in FIG. 1 and FIG. 2, or other objects (including persons) approaching. The method and system can provide protection to people walking around a city with a messaging and tracking system. The method and system can connect a tracked network of individuals with others as well as police, when needed for immediate support. In some embodiments, the method and system track a user's location amongst their friends and broadcast to their friends or to all people in the immediate surrounding area if a call for help is initiated, for example, for networked 911 system.

In various embodiments, the application uses sensor data to track the speed and direction of the user 20 in FIG. 2 who is inputting the data using the application, and based at least in part on that sensor data (which may include variously accelerometer data, gyroscope data, GPS data, Wi-Fi data, other radio data, and other user provided data), the application can determine the relative speed of the identified subject vehicle to project and calculate all possible trajectories of the identified subject vehicle 30 in FIG. 2 over an adjustable setpoint of time. As also described above, the license plate or other data identifying the subject vehicle 30 may be used to determine potential destinations for the subject vehicle 30 and to determine projected routes and how such routes might potential intersect with that of the system users.

Moving object predictive locating reporting and alerting for other types of objects besides unsafe drivers within the scope of the present technology and described further herein.

For example, drones or other automated sensing devices can be used to monitor and/or identify a moving object and take various actions. In some embodiment, one or more drones are launched in response to a report of a moving object. Drones can be launched from other moving vehicles, from stationary stored locations, or from roving vehicles tasked to follow tagged objects. The moving object can be detected by the drone(s), (e.g., based on the initial report with descriptors), reported, tagged and followed. Some embodiments provide a unique identifier for any target moving object; use a network of available sensors from moving vehicles, fixed points, IoT device, etc.; and deliver data to a central system for later identification and tracking. This system may be cloud-based and could be decentralized for increased security and capability. In some embodiments, reports from users and sensors are monitored to help combat false positives. Additionally, the weighting effect of multiple reports of the same moving object in a limited area over time can help combat false positives. If only one report of the moving object is received, it may be less weighted compared to the multiple reports.

Exemplary methods include a system for real-time tracking using, for examples, drones and/or networked sensor technology. In some embodiments, drones or other sensor carrying devices (hard mounted or mobile—including law enforcement vehicles and autonomous vehicles) identify and image targets using sensors such as photo, laser, lidar, infrared, radar, sonic, etc. to identify a target's unique identity (e.g., turning objects into their own QR codes, in essence) so other networked sensor systems can help recognize and update target location and other target deltas to the central system.

In some embodiments, the method can calculate the movement of an object in any predictable direction based on the movement range and characteristics of that object, including rate of acceleration and range of speed. Such embodiments may aid, for example, in the tracking of drones that could pose a danger to passenger aircraft, vehicles, or people.

Various embodiments are based on the speed of a relative vehicle at the time detection was made. The following may be considerations for the speed determination: real time traffic patterns; speed limit of roadway/street; speed of user reporting hazard, rate of acceleration, speed range of object's make and model. Rate of acceleration and speed can be sensed with updated data from sensors, from users reporting hazard/object; and based on calculations using known maximum acceleration and maximum top speed of hazard/object. As used herein, roadway describes any road which could be a freeway, expressway, highway, ramp, street, passageway, service road, alley, avenue, boulevard, turnpike, autobahn, motorway, dirt roads, gravel, and other types of roads.

In some embodiments, the map drawings and route information, other than the information related to the hazards and other objects, predictive locating, reporting and alerting described herein, may be based, at least in part, on commercially available map information. In that regard, in various embodiments, a hazard reporter module sends the hazard (or other object) report to a server (or other computer on which a portion of the computing power for executing the method may reside). The report can include one or more of the latitude/longitude coordinates of the reporter vehicle and, if any was recorded, a voice file. The method may calculate a polygon from the reported location, look up users reporting within that polygon within a certain number of minutes (e.g., 30 minutes for instance). The method initiates the sending of alerts (e.g., push notifications) to all users meeting the above criteria. The method may generate an application programming interface (API) request to a map server for route from hazard (or other object) report latitude/longitude to current alerted user latitude/longitude. The method configures the user interface for the alerted user to displays a map with their location, the hazard (or other object) reported location, and an animated polyline running from the hazard (or other object) reported location to the user's current location.

In some embodiments, the method running in the application may make an API request to a map server that includes a request for all primary roadways within a certain travelable timeframe from the hazard (or other object)

report. The method initiates a display on the user interface of the alerted user to display highlighted primary roadways for all locations the hazard (or other object) may have traveled within that time frame. In some embodiments, this can include displaying polygons of a potentially traveled area within a timeframe and displaying polylines for all primary roadways between the polygons.

In other embodiments, the method provides the option to have people report "harmless" animals such as deer, owls, eagles, etc. for birdwatchers, for fun and/or for photo opportunities. The method could, based on the movement determined from sensors and/or reports, determine how busy a trail is based on monitoring trail traffic. In some embodiments, the method can detect people running in panic and use that information to alert users of possible danger.

In some embodiments, alerts can be generated concerning dangerous weather including movement, for example, flash floods, tidal flood, tsunami, storms, mudslides, tornadoes, wind, snow, rain, earthquakes, etc. Other reports and alerts could concern water contamination due to, for example, red tide, chemical spills, etc. and could include alerting all appropriate authorities.

In some embodiments, the present technology may be utilized by a pedestrian that observes a hazard (or other object) to warn others, e.g., hazard (or other object) being a vehicle driving on a sidewalk, heading to the sidewalk, etc. In other embodiments, the system can utilize built-in pedometer and accelerometer functionality in the mobile device to confirm if a person is actually walking instead of driving slowly or cycling slow. The technology can additionally utilize the mobile device's (e.g., cell phone's) or utilized device's accelerometer and/or gyroscope.

For scuba diving, for example, the method can be used to detect based on sensors/reports that sharks in the area and other dangers and report same to users.

In other embodiments, the system may predict the outward potential movement of an individual in a vehicle, on foot, using mass transit, or using an electric bike (e-bike), an electric scooter (e-scooter), or any other forms of transportation.

In some embodiments, military uses may be provided to protect and network soldiers from enemy combatant threats in all possible forms whether it be soldiers, vehicles, drones, ballistics, etc. In any location, the method and system may track the outward movement of an identified soldier on foot and how fast they could move in all locations based on the fastest rate of speed of a human on foot. Various embodiments can provide multiple projections based on the ability of the object. For example, the system can provide three projections/reachable range polygons based on the ability for a combatant soldier to change his/her method of movement. For example, a person may change quickly from running to driving to flying. All these scenarios can be calculated and filtered for considering by the receiver.

The method and system, based on its determinations, can confirm the earliest possible time of encounter as well as all possible locations of the opposing force within a polygon in its outward movement prediction capability through reachable range technology based on movement through time. This can help all surrounding friendly forces know the earliest possible encounter time frame or location for strategic preparation. In some embodiments, our forces can use the information from an analytics perspective for all needed scenarios.

Insurance companies can see an immediate metric and reduction in claims, once the present technology is paired with their services. Customers could then be more aware of hazards (or other objects) and will have the ability to maneuver around known hazards (or other objects), which should reduce accidents and insurance costs, for example.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The description of the present technology has been presented for purposes of illustration and description but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

The invention claimed is:

1. A computer-implemented method for predicting the potential path and movement of an in air moving object, the computer-implemented method comprising:

receiving moving object data including a speed and direction of travel of said in air moving object relative to a first user corresponding to said in air moving object at a first Global Positioning Satellite (GPS) of said first user location and sending said moving object data and said first Global Positioning Satellite (GPS) information to a server;

said server determining a future proximity of said in air moving object;

said determining said potential path of travel is further based on one or more historical traits concerning the in air moving object and a medium that the in air moving object is moving through;

receiving data from a Global Positioning Satellite (GPS) sensor for at least a second user that determines a location speed and direction of travel of the at least a second user;

said server merging the received moving object data and the received Global Positioning Satellite (GPS) sensor data of said at least a second user into a set of merged data;

based on the set of merged data along with a street map grid, said server determines a potential path of travel for the in air moving object relative to said at least a second user for calculated potential interaction of said in air moving object with said at least a second user;

said server sends a notification to said at least a second user if said at least a second user is calculated to be in a path of said future interaction proximity of said in air moving object;

said determining a potential path of travel comprises calculating an area from the predicted location or range of locations for the in-air moving object and determining whether one or more other objects are located within the area of travel, and determining potential for danger of the in air moving object with the other or more other objects, comparing the potential to a threshold, using a result of the comparing to determine a level of notification of danger to provide for an alert at the determined level of notification.

2. The computer-implemented method of claim 1, wherein the in air moving object data is a vehicle in air, a drone, or a ballistic.

3. The computer-implemented method of claim 1 wherein for the determining a potential path of travel uses, different weights that are applied for the historical data, and the medium.

4. The computer-implemented method of claim 1, wherein the medium includes one or more of terrain, air and space.

5. The computer-implemented method of claim 4, wherein the medium changes over the potential path, the determining a potential path of travel being adjusted as a function of change in the medium that the in air moving object will potentially move through over the potential path.

6. The computer-implemented method of claim 1, wherein the one or more historical traits include statistical movement characteristics of the in air moving object.

7. The computer-implemented method of claim 6, wherein the statistical movement characteristics include acceleration and speed ability of the in air moving object.

8. The computer-implemented method of claim 7, wherein the determining a potential path of travel of the predicted location or range of locations and the potential path are based on predicting acceleration and speed of the in air moving object as a function of the medium that the in air moving object is moving through.

9. The computer-implemented method of claim 7, wherein the determining a potential path of travel of the predicted location or range of locations and the potential path further includes automatically adjusting maximum acceleration and maximum speed of the in air moving object as a function of the medium that the object is moving through.

10. The computer-implemented method of claim 1, wherein based on the set of merged data, the determining a potential path of travel is of both the predicted location or range of locations for the in air moving object, and the potential path of travel for the in air moving object.

11. The computer-implemented method of claim 1, wherein the determining a potential path of travel of the predicted location or range of locations for the in air moving object and the potential path of travel for the in air moving object is based at least in part on a predicted destination for the in air moving object.

12. The computer-implemented method of claim 11, wherein the destination is predicted based on one or more of:
   (a) the one or more historical traits which include historical data showing a pattern of the in air moving object having certain destinations at the time and the place of the movement;
   (b) past destinations for the potential path of travel of the in air moving object; and
   (c) a calendar having entries concerning the in air moving object; wherein different weights are given to each of (a), (b), and (c) in predicting the destination, wherein the different weight given to the historical data in (a) varies at least in part as a function of how recent the historical data occurred.

13. The computer-implemented method of claim 1, further comprising receiving additional in air moving object data from at least a second user concerning observing the in air moving object at a particular time;
   wherein the determining a potential path of travel includes said server triangulating a predicted location or range of positions and the potential path as a function of:
   the one or more reports from the first user and at least a second user.

14. The computer-implemented method of claim 13, wherein for the triangulating greater relative weight is given when the one or more reports includes multiple reports in a limited geographic area regarding the in air moving object.

15. The computer-implemented method of claim 14, further comprising receiving additional sensor data from other sensors, wherein the triangulating is further a function the additional sensor data.

16. The computer-implemented method of claim 1, wherein further includes collecting sensor data comprises camera image, compass position and tilt angle from a mobile device.

17. The computer-implemented method of claim 1, further comprising:
   causing display of a plurality of projections/reachable range polygons as a function of potential methods of movement for the in air moving object.

* * * * *